July 29, 1952 — L. S. GALSTAUN — 2,605,214
CATALYTIC CRACKING OF NITROGEN-CONTAINING OILS
Filed May 22, 1948
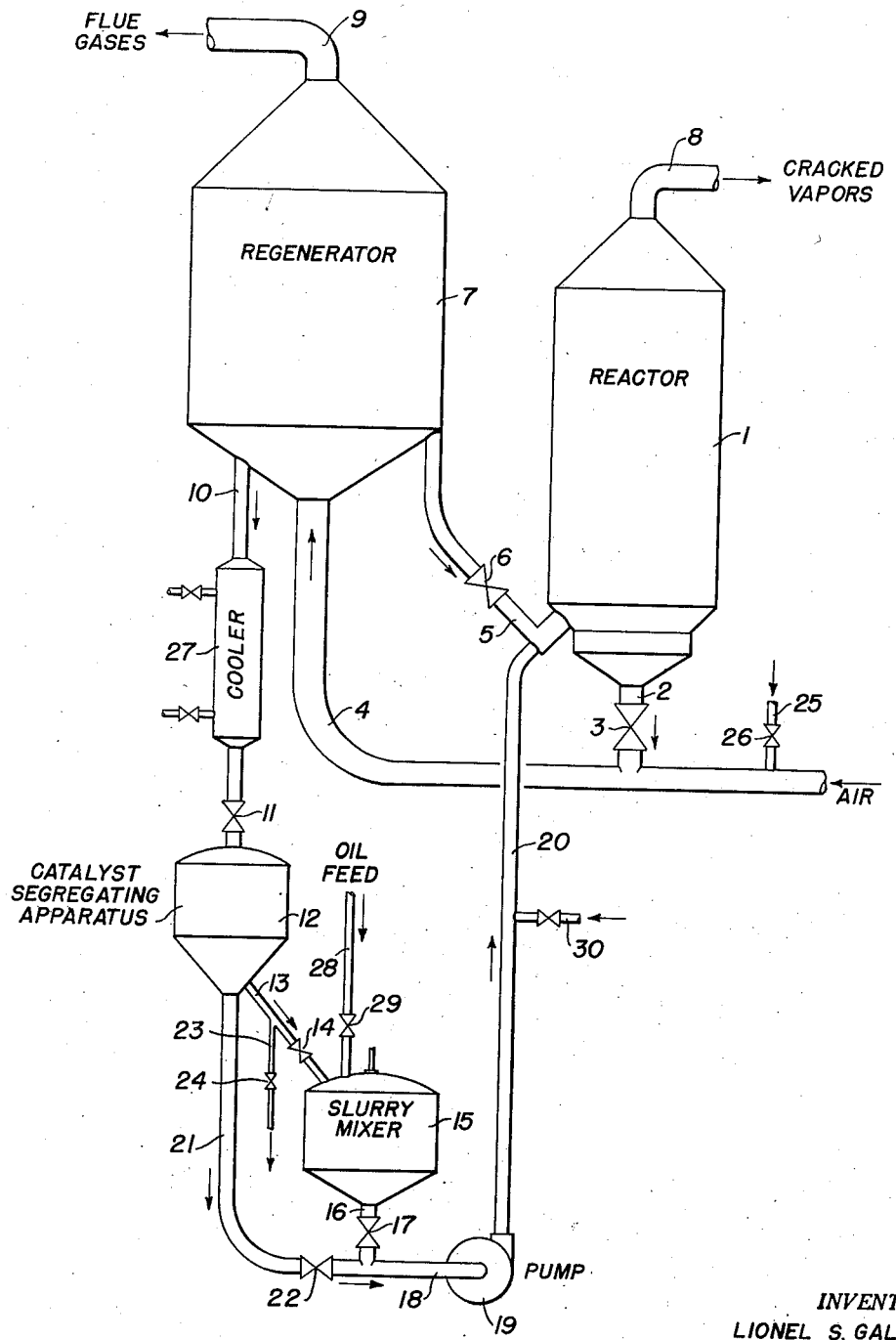
INVENTOR.
LIONEL S. GALSTAUN
BY
Thomas G. Bell
AGENT Patented July 29, 1952

2,605,214

UNITED STATES PATENT OFFICE 2,605,214

CATALYTIC CRACKING OF NITROGEN-CONTAINING OILS

Lionel S. Galstaun, San Francisco, Calif., assignor to Tide Water Associated Oil Company, San Francisco, Calif., a corporation of Delaware Application May 22, 1948, Serial No. 28,553

7 Claims. (Cl. 196—52)

This invention relates to the catalytic cracking of hydrocarbon oils containing appreciable amounts of organic nitrogen compounds which tend prematurely to destroy the activity of the cracking catalyst. Its primary object is to provide a means whereby the more reactive nitrogen compounds, or the nitrogen compounds most active in "poisoning" the catalyst, are adsorbed on catalyst of already low activity before the oil is charged to catalytic cracking operations. Other objects will be apparent from the following description.

As is well known in the art of catalytic cracking, the catalyst employed becomes rapidly coated with a deposit of carbon or carbonaceous matter and requires frequent "regeneration" or burning off of these deposits to maintain its efficiency. Catalyst containing these deposits is spoken of as "spent" catalyst and, after burning off the deposits as "regenerated" catalyst. It is also well known that, as a result of continued use and regeneration, the catalyst gradually declines in activity requiring ultimate replacement in order to maintain an economic or desired conversion rate. Likewise, it is becoming recognized that the presence of organic nitrogen compounds in the oil treated causes a substantial increase in the rate at which the activity declines. This effect of nitrogen compounds in prematurely lowering the activity of catalyst is spoken of as a "poisoning" of the catalyst. As is to be expected, some nitrogen compounds exhibit this poisoning effect to a greater degree than others.

In accordance with the present invention the more reactive of the nitrogen compounds contained in the oil to be cracked are first adsorbed on catalyst which has already reached a low degree of activity, thus permitting the main body of catalyst to perform its function relatively free from the poisoning effect of the highly reactive nitrogen compounds. It is therefore an object of the invention to provide a method for extending the useful life of a cracking catalyst when nitrogen compounds are present in the oil to be cracked.

The invention is particularly adapted for use in conjunction with the well known "fluid" method of catalytic cracking wherein the catalyst, in powdered form, is maintained in a mobile condition resembling a fluid in the reactor and regenerator. This mobile condition of the catalyst permits its easy transfer through pipes between the reactor and regenerator and elsewhere. Accordingly, the invention is described below in connection with such a fluid process, and is illustrated in the accompanying drawing which depicts in more or less diagrammatic form a flow-diagram of the invention in relation to certain essential parts of a fluid catalytic cracking plant.

In the drawing there are shown reactor 1 and regenerator 7 of a fluid catalytic cracking system. Line 2 controlled by valve 3 and line 4 are provided for transferring spent catalyst from reactor 1 to regenerator 7, and line 5 controlled by valve 6 for transferring regenerated catalyst from regenerator 7 to reactor 1. Transfer line 8 connects reactor 1 to the distilling equipment (not shown) and flue gas line 9 connects regenerator 7 to a chimney (not shown). As is apparent, the reactor 1 and regenerator 7 will normally be provided with internal cyclones or other means for trapping out catalyst fines from their respective outlet gases. Also, other precipitating or separating means may be provided in either of lines 8 and/or 9.

For practicing the invention there may be provided catalyst segregating apparatus 12, suitable for separating catalyst of low activity from catalyst of higher activity. This may be in the form of an electrostatic separator such as described in U. S. Patent 2,430,015 to Hatton, Cleveland, and Perry. Alternately, it may be in the form of any well known air-separator capable of separating dense from light particles. Preferably, segregating apparatus 12 may comprise a combination of catalyst separating apparatus such as described in copending application Serial Number 12,114 filed February 28, 1948, by Draemel, Ammer and Anderson, and now abandoned, which describes the separation of low from high activity catalyst by first classifying the catalyst according to particle size and then separating each size into light and dense portions. The dense catalyst, in each case, is found to be the lower in activity. Catalyst segregating apparatus 12 is provided with line 10 and valve 11 for receiving catalyst from regenerator 7; line 13, controlled by valve 14, for discharging low activity catalyst; and line 21, controlled by valve 22, for discharging high activity catalyst.

Also, for the purposes of the invention there may be provided slurry mixer 15, for contacting oil-feed from line 20 with low activity catalyst. Slurry mixer 15 is provided with outlet line 16 controlled by valve 17. Slurry mixer 15 should be of sufficient size, or should have a surge tank of suitable capacity, to permit the desired time of contact of oil with low-activity catalyst to permit the selective adsorption of nitrogen compounds on the low-activity catalyst. Pump 19 is provided to charge the oil-catalyst slurry from mixer 15 and high activity catalyst from segregating apparatus 12 to reactor 1.

The following procedure is illustrative of the invention when used in conjunction with apparatus similar to that depicted in the drawing.

In accordance with principles well understood in the art, in reactor 1 a bed of powdered catalyst is maintained in a mobile condition, resembling a fluid, by means of oil vapors passing upwardly therethrough which are undergoing cracking. The cracked products leave through line 8 for fractionation and any desired further refining. Feed oil to be cracked enters reactor 1 through line 20 (which in conventional practice, without the procedure of the present invention, would come directly from storage as, for example, through line 30). Heat to vaporize the oil and to provide the required temperature for cracking is supplied by hot catalyst entering reactor 1 from regenerator 7 through line 5. In regenerator 7 a bed of catalyst undergoing regeneration is maintained in a similar fluid condition by means of an air stream entering through line 4, which air provides the oxygen for the regeneration of the catalyst. Spent catalyst accumulating in the bottom of reactor 1 is stripped of entrained hydrocarbons by means of steam and is passed through line 2 and valve 3 into line 4 wherein the air stream conveys it to regenerator 7. Regenerated catalyst is withdrawn from regenerator 7 and returned by gravity to reactor 1 through valve 6 and line 5 to complete the cycle. The products of combustion leave regenerator 7 through line 9.

As aforesaid the activity of the catalyst in the system gradually declines, and, in order to maintain a desired activity level in the system, fresh catalyst is added from storage, as for example through line 25, to replace a similar amount of catalyst lost or withdrawn from the system. The catalyst in the system, therefore, is an equilibrium mixture of fresh catalyst of high activity and other catalyst of various degrees of lower activity.

To this point the procedure described is in accordance with the conventional operation of the fluid cracking process, and, when nitrogen compounds are present in the oil feed the decline of activity of the catalyst would, in the absence of the steps of the invention now to be illustrated, be substantially greater than with nitrogen-free oil, which would result in larger amounts of fresh catalyst being required to maintain any desired activity level in the system. However, by means of the steps of the invention, the oil is given a preliminary treatment with low activity catalyst to adsorb nitrogen compounds thereon and thus leave the remaining catalyst relatively free from poisoning by the nitrogen compounds.

To this end, and illustrative of the invention, part of the regenerated catalyst in regenerator 7 is withdrawn through line 10, controlled by valve 11, and fed to catalyst segregating apparatus 12. As aforesaid, segregating apparatus 12 may be any means for separating catalyst of low activity from catalyst of higher activity, and may be illustrated by means of an air-blast classifier which separates dense particles from lighter particles. Dense particles of catalyst, which are known to be of lower activity than the lighter particles, pass from segregating apparatus 12 through line 13 and valve 14. Light particles pass out through line 21. The low activity catalyst from line 13 is fed to slurry mixer 15 wherein it is mixed thoroughly with oil to be treated entering through line 28 and valve 29. Sufficient time is given in mixer 15 for at least the more reactive nitrogen compounds to become adsorbed on the low-activity catalyst. Appreciable amounts of nitrogen compounds will be adsorbed in a time ranging upwards of one or two minutes, although a time interval of five to fifteen minutes is preferred to insure optimum adsorption. The oil-catalyst slurry is then withdrawn through line 16 and valve 17 and enters line 18 whence it is pumped, in admixture with high activity catalyst from line 21 and valve 22, by pump 19 through line 20 into reactor 1. In reactor 1 the main body of oil is vaporized from the catalyst leaving the adsorbed nitrogen compounds or coke formed therefrom attached to the low-activity catalyst, which in due course returns to regenerator 7 and ultimately is withdrawn through line 10 and resegregated in apparatus 12 for further treatment of fresh oil.

When oil of low nitrogen content is to be cracked simultaneously with oil of high nitrogen content, it is preferred to charge only the high-nitrogen oil through line 28 to slurry mixer 15 for adsorption of the nitrogen compounds on the low-activity catalyst. The low-nitrogen oil, in such a case, is preferably segregated and fed to the process through line 30, or otherwise charged directly into reactor 1. Such treatment with a plurality of charge stocks of varying nitrogen contents permits maximum nitrogen removal from the high-nitrogen content stocks with a minimum of low-activity catalyst being segregated in segregator 12.

When desired, part of the low-activity catalyst may be discarded from the system through line 23 and valve 24 and fresh make-up catalyst supplied through line 25 and valve 26. If desired, cooler 27 may be inserted in line 10 in order to control the temperature of the catalyst fed to segregating apparatus 12. Cooler 27 may also be used to absorb excess heat from regenerated catalyst in order to reduce the temperature in reactor 1.

In order to attain the most satisfactory adsorption of nitrogen compounds on the low-activity catalyst, the weight ratio of oil feed to low-activity catalyst should be between about 1:1 and 2:1. Higher ratios, while useful in some cases, generally reduce the amount of nitrogen compounds adsorbed, while at ratios below 1:1 troubles may be encountered in obtaining a satisfactory slurry due to the high solids content. In practicing the invention, it will thus be seen that a fairly high percentage of nitrogen-contaminated catalyst is continually maintained in the reactor and regenerator in order to provide sufficient low-activity catalyst for the pretreatment of the oil feed in mixer 15. Such percentage will generally range from about 10% upwards to about 25% or more.

The invention may further be illustrated by reference to the accompanying table which shows data typical of the operation of a fluid catalytic cracking process operating (a) in a conventional manner with oil feeds of low and relatively high nitrogen contents and operating (b) in accordance with the invention with two different ratios of low activity catalyst to oil feed charged to the slurry mixer. It will be observed from the table that, while the nitrogen content of the oil is only partly removed by treatment with the low activity catalyst, sufficient of the more objectionable nitrogen compounds are adsorbed on the catalyst to substantially reduce the poisoning effect on the main body of catalyst thereby greatly reducing the amount of fresh catalyst needed to maintain activity at a desired equilibrium level.

*Operations typical of fluid catalytic cracking*

|  | Conventional Operation | | Operation in Accordance With Invention | |
|---|---|---|---|---|
| Nitrogen Content of Feed Oil _____(percent)__ | 0.04 | 0.32 | 0.32 | 0.32 |
| Oil Feed to Reactor _____(bbl./day)__ | 14,000 | 14,000 | | |
| Oil Feed to Slurry Mixer _____(bbl./day)__ | | | 14,000 | 14,000 |
| Spent Catalyst from Reactor to Regenerator _____(tons/day)__ | 36,000 | 36,000 | 36,000 | 36,000 |
| Regenerated Catalyst from Regenerator to Reactor_____do____ | 36,000 | 36,000 | 26,400 | 24,000 |
| Regenerated Catalyst from Regenerator to Segregator__do____ | | | 9,600 | 12,000 |
| High Activity Catalyst from Segregator to Reactor_____do____ | | | 7,200 | 10,800 |
| Low Activity Catalyst Segregated_____do____ | | | 2,400 | 1,200 |
| Low Activity Catalyst to Slurry Mixer_____do____ | | | 2,399 | 1,198 |
| Low Activity Catalyst Discarded_____do____ | | | 1 | 2 |
| Equilibrium Catalyst Discarded_____do____ | 0 | 5 | | |
| Catalyst Lost from Chimney_____do____ | 5 | 5 | 5 | 5 |
| Fresh Catalyst to Maintain Equilibrium_____do____ | 5 | 10 | 6 | 7 |
| Nitrogen Content of Oil Leaving Slurry Mixer_____(percent)__ | | | 0.16 | 0.22 |

In a particular embodiment of the invention the operation and equipment for the catalyst segregation is substantially simplified by providing for the cracking process a body of catalyst composed of particles of which about 10 to 25% are substantially larger in diameter than the remainder. To these coarse particles is delegated the function of removing nitrogen compounds from the oil feed. These coarse particles, therefore, become rapidly poisoned for catalytic cracking but remain active for nitrogen removal and are circulated again and again to the oil pretreating step. Since the main loss in activity of the catalyst will occur in the coarse particles, the separation of low activity catalyst from high activity catalyst becomes merely a matter of separating coarse from fine particles. This may be readily accomplished by simple apparatus such as screens or an air-classifier of the type designed to separate particles according to size. The fact that the coarse particles, being of low activity, are denser will generally assist in the separation where an air-classifier is used.

A similar purpose may be attained by providing cracking catalyst composed of particles of which about 10 to 25% are substantially smaller in diameter than the remainder, and delegating to the fine particles the function of removing nitrogen compounds from the oil feed. In such a case, the fine particles would become rapidly poisoned for catalytic cracking but would remain active for nitrogen adsorption. Segregation of low activity catalyst from high activity catalyst would be merely a matter of separating fine from coarse particles and, accordingly, the segregation process would be greatly simplified.

The invention is primarily adapted for use in catalytic cracking where catalysts of the silica-alumina type are employed, either synthetically prepared or from naturally occurring clays. However, it is contemplated to use the invention in conjunction with any catalyst which (a) will be poisoned by nitrogen compounds, (b) can be segregated into portions of respectively low and high activity, and (c) will selectively adsorb nitrogen compounds. Any such catalyst is intended to come within the scope of the term "catalyst" as employed herein, and the term "catalyst" is intended to be limited to catalyst meeting these three conditions.

While the invention is most readily adaptable to the fluid type of catalytic cracking, with proper arrangement it may be adapted to other types by following well known engineering procedures.

In the above description, the segregation of catalyst into low-activity and relatively high activity portions has been discussed. As will be readily apparent to the refinery technician, no absolutely sharp separation is obtained between particles having a given activity and those of somewhat different activity. Most classifying procedures result in an overlap of properties in the segregated fractions and the purposes of the invention will be satisfied by portions having substantially different average properties.

In the appended claims the terms "spent" and "activity" as applied to catalyst are used with the same respective meanings hereinabove used and more fully explained. Thus, "spent catalyst" is used to denote catalyst whose ability to function is temporarily impaired by carbonaceous deposits which are removed in the regeneration step, restoring the catalyst to approximately its original condition. In contrast, "catalyst of low activity" and similar expressions denote catalyst whose ability to function in the cracking operation is either originally low or has become low through continued use and remains low even after normal regeneration.

I claim:

1. In the catalytic cracking of hydrocarbon oil containing nitrogen compounds which tend to poison the cracking catalyst, the method of extending the useful life of the catalyst which comprises contacting such a hydrocarbon oil in the liquid phase end under non-cracking conditions with catalyst of relatively low cracking activity for a time sufficient to adsorb on said low activity catalyst at least a part of the nitrogen content of said oil, then contacting the resulting mixture of liquid oil and catalyst with heated catalyst of relatively higher cracking activity under cracking conditions to volatilize and to crack said oil.

2. An improved method of catalytically cracking hydrocarbon oil containing organic nitrogen compounds which comprises: maintaining a body of cracking catalyst in a cracking zone under conditions suitable to crack hydrocarbon oil, introducing treated liquid hydrocarbon oil from a later stage of the process into said cracking zone whereby the oil is volatilized and cracked and the catalyst becomes spent, maintaining a body of spent catalyst undergoing regeneration in a regeneration zone, introducing air into said regeneration zone under conditions suitable to regenerate said spent catalyst, transferring spent catalyst from said cracking zone to said regeneration zone, transferring regenerated catalyst from said regeneration zone to said cracking zone, removing from said regenerated catalyst a portion thereof of relatively low cracking activity, contacting the removed portion with liquid hydrocarbon oil containing organic nitrogen compounds under conditions sufficient to adsorb nitrogen compounds from the oil onto the low activity catalyst, then introducing the resulting mixture of thus contacted liquid oil and catalyst into said cracking zone as the aforementioned treated hydrocarbon oil.

3. An improved method of catalytically cracking hydrocarbon oil containing organic nitrogen compounds which comprises: maintaining a body of cracking catalyst in a cracking zone under conditions suitable to crack hydrocarbon oil, introducing treated liquid hydrocarbon oil from a later stage of the process into said cracking zone whereby the oil is volatilized and cracked and the catalyst becomes spent, maintaining a body of spent catalyst undergoing regeneration in a regeneration zone, introducing air into said regeneration zone under conditions suitable to regenerate said spent catalyst, transferring spent catalyst from said cracking zone to said regeneration zone, transferring a portion of regenerated catalyst from said regeneration zone to said cracking zone, removing a second portion of regenerated catalyst from said regeneration zone, classifying said second portion by particle size, separating a classified size into a fraction of relatively high activity and a fraction of relatively low activity, introducing said fraction of relatively high activity into said cracking zone, contacting said fraction of relatively low activity with liquid hydrocarbon oil containing organic nitrogen compounds under conditions sufficient to adsorb nitrogen compounds from the oil onto the low activity catalyst, then introducing the thus contacted liquid oil into said cracking zone as the aforementioned treated hydrocarbon oil in admixture with the low activity catalyst containing adsorbed nitrogen compounds whereby to minimize the quantity of fresh catalyst needed to maintain activity at a desired equilibrium level.

4. In combination with a hydrocarbon catalytic cracking process in which powdered catalyst is maintained in a mobile condition resembling a fluid in a catalytic system which includes a cracking zone and a regeneration zone, the method of extending the useful life of the catalyst which is subject to poisoning by nitrogen compounds, which comprises: removing a portion of regenerated catalyst from said system, separating said portion into a plurality of fractions differing from each other in average cracking activity, returning fractions of relatively high activity to said system, contacting nitrogen-containing liquid hydrocarbon oil under non-cracking conditions with a fraction of relatively low activity for a time sufficient to adsorb nitrogen compounds from said oil, and charging the thus treated liquid oil as charge stock to said cracking zone in admixture with the low activity catalyst containing the adsorbed nitrogen compounds.

5. The method of claim 4 in which the portion of regenerated catalyst removed from the system is separated into portions of relatively low and relatively high activities in accordance with the particle densities of the catalyst.

6. The method of claim 4 in which the portion of regenerated catalyst removed from the system is separated into portions of relatively low and relatively high activities by electrostatic means and in accordance with the electrostatic properties of the particles.

7. The method of reducing the quantity of fresh catalyst needed to maintain activity at a desired equilibrium level in the catalytic cracking of hydrocarbon oils, suitable for catalytic cracking but which contain catalyst-poisoning nitrogen compounds, by absorbing a sufficient amount of the more objectionable nitrogen compounds on a minor quantity of low activity catalyst to reduce substantially the poisoning effect on the major body of catalyst, in a system where such a nitrogen-containing oil is treated in a cracking zone with a cracking catalyst in so-called "fluid" condition, the spent catalyst is passed to a regenerating zone with air, and the regenerated catalyst is returned to the cracking zone, which comprises: diverting a minor part of the regenerated catalyst from the regenerating zone, segregating the diverted part into a more active portion and a less active portion, contacting the less active portion with the oil in liquid phase at a temperature well below that required for cracking for a time sufficient to absorb nitrogen compounds from the oil, and then introducing the resulting mixture and the said more active portion of regenerated catalyst into the cracking zone together with the non-diverted or major part of the regenerated catalyst whereby in the cracking zone the nitrogen compounds are held sufficiently by the poorer or less active catalyst to prevent their poisoning the better or more active catalyst, and the rate of decline of activity of the catalyst is consequently lowered.

LIONEL S. GALSTAUN.

REFERENCES CITED

The following references are of record in the file of this patent:

UNITED STATES PATENTS

| Number | Name | Date |
|---|---|---|
| 2,305,020 | Mau | Dec. 15, 1942 |
| 2,377,513 | Page, Jr. | June 5, 1945 |
| 2,378,531 | Becker | June 19, 1945 |
| 2,382,755 | Tyson | Aug. 14, 1945 |
| 2,384,315 | Kuhl | Sept. 4, 1945 |
| 2,414,973 | Nelson | Jan. 28, 1947 |
| 2,432,644 | Alther | Dec. 16, 1947 |
| 2,437,352 | Fragen | Mar. 9, 1948 |
| 2,450,724 | Grote | Oct. 5, 1948 |

FOREIGN PATENTS

| Number | Country | Date |
|---|---|---|
| 411,477 | Great Britain | June 4, 1934 |